A. N. JONES.
CLUTCH.
APPLICATION FILED APR. 10, 1912.
1,185,102.
Patented May 30, 1916.
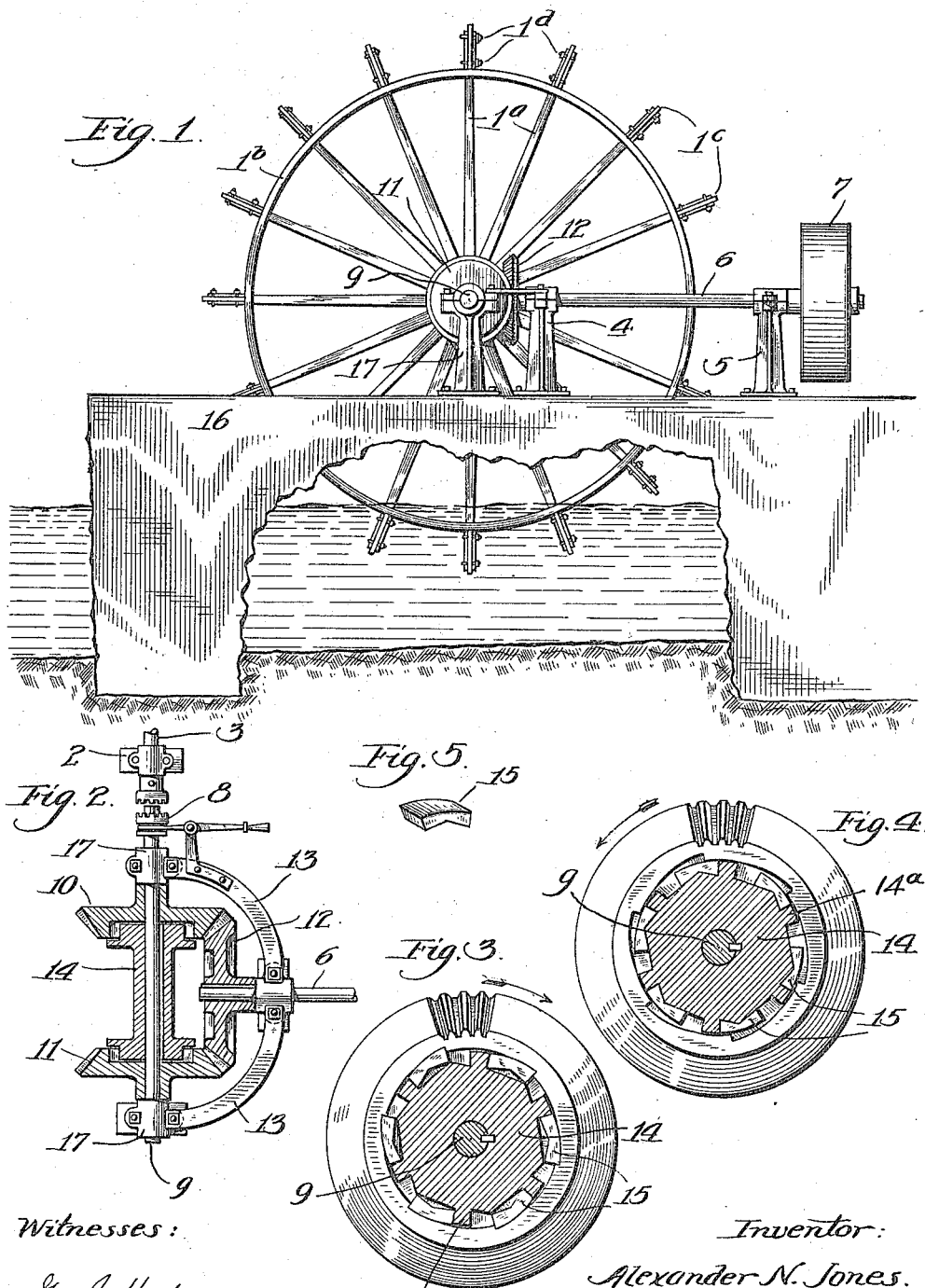
Witnesses:
Geo. J. Huting.
Mary A. Bowman.
Inventor:
Alexander N. Jones.
By A. B. Bowman
his Atty

UNITED STATES PATENT OFFICE.

ALEXANDER N. JONES, OF SAN DIEGO, CALIFORNIA.

CLUTCH.

1,185,102.  Specification of Letters Patent.  Patented May 30, 1916.

Application filed April 10, 1912. Serial No. 689,708.

*To all whom it may concern:*

Be it known that I, ALEXANDER N. JONES, a citizen of the United States, and a resident of San Diego, in the county of San Diego and State of California, have invented certain new and useful Improvements in Clutches, of which the following is a specification.

My invention relates to clutches to be used for transmitting power where the power is alternated from one direction to another for instance, in water currents, where the tides cause the current, for a length of time, to flow in one direction and for a time to flow in the opposite direction, and the objects of my invention are: first, to provide a clutch of this class which is positive in its action and allows only a minimum of movement in either direction without the transmission of power, and second, to provide a clutch of this class which is simple and economical of construction, durable, easily installed and does not readily get out of order.

With these and other objects in view as will appear, my invention consists of certain novel features of construction, combination and arrangement of parts as will be hereinafter described in detail and particularly set forth in the appended claims, reference being had to the accompanying drawings and to the characters of reference thereon, which form a part of this specification, in which:—

Figure 1 is a side elevational view of one unit of my current motor, showing a portion of the pier broken away, to facilitate the illustration, Fig. 2 is a partial plan and sectional view of the gear portion of my mechanism, Fig. 3 is a detail side view on an enlarged scale, showing my clutch mechanism in engagement, Fig. 4 is a similar view showing said clutch mechanism out of engagement and Fig. 5 is a detail perspective view of one of the clutch members.

Similar characters of reference refer to similar parts throughout the several views.

The water wheel 1, bearing 2, wheel shaft 3, bearings 4 and 5, shaft 6, pulley 7, clutch 8, intermediate shaft 9, bevel gear 10, bevel gear 11, bevel gear 12, braces 13, inner clutch member 14, clutch dog 15, and pier 16, constitute the principal parts of my current motor.

The water wheel 1 is preferably of a large diameter and similar to the ordinary undershot type and is rigidly mounted in the ordinary manner on the shaft 3, which is revolubly mounted on bearings 2. It is provided with a plurality of spokes $1^a$, and with outer brace rings $1^b$. The spokes $1^a$ extend past said rings $1^b$ some distance, and mounted in the ends of said spokes are the blades $1^c$, having a portion of the spokes extending on each side of said blades. These blades are rigidly mounted by means of bolts $1^d$. The blades being placed centrally in the ends of the spokes, give strength to their connections for the action of the current moving in both directions. Mounted on the pier 16 with one of its ends abutting against shaft 3 is an intermediate shaft 9, which is revolubly mounted on the bearings 17 and adapted to connect the abutting ends of the shafts 9 and 3 is provided the clutch 8 which is an ordinary sliding clutch. Revolubly mounted on the shaft 9 are bevel gears 10 and 11, which face toward each other and are each provided in its inner surface with a circularly shaped recess provided with a plurality of notches in its wall, which extend at right angles, as shown best in Figs. 3 and 4. Between these bevel gears 10 and 11 is a spool shaped inner clutch member 14, which is rigidly mounted on said shaft 9. Each outer end of this clutch member 14 is provided with a plurality of lugs $14^a$, the outer surfaces of which are curved to conform to the walls of the recesses in the bevel gears 10 and 11 and between these lugs are doubly inclined surface recesses shaped as shown best in Figs. 3 and 4 of the drawings. The outer ends of the clutch member 14 extend into the recess in said bevel gears. Mounted in said recess between the two members are a plurality of slidable dogs 15 with the outer surface of each curved and its inner surface doubly inclined and shaped as shown best in Fig. 5 of the drawings. The inner clutch member 14 revolves in the direction as shown by the arrows in Fig. 4, a portion of these dogs 15, by reason of the force of gravity and the pressure and friction on their outer surfaces, assume the position as shown in Fig. 4, and, when said clutch member is revolved in the opposite direction as shown by the arrows in Fig. 3, gravity causes all of said dogs that are in a position to do so to drop into the positions as shown in said Fig. 3, thereby causing the one end of each of said dogs to contact with one of the projections caused by the notches in the recess of the beveled gears 10 or 11, while the opposite end thereof similarly contacts with the projections on the edges of the ends of the inner clutch members. It will be here noted that the arrangement of the recesses and clutch members at one end of said inner clutch member is opposite to their arrangement at the other end, thereby allowing the shaft 6 to revolve in one direction at all times by the action of the bevel gears 10 and 11 in engagement with bevel gear 12, mounted on the inner end of shaft 6.

Though I have shown and described a particular construction and arrangement of parts, I do not wish to be limited to this particular construction and arrangement, but desire to include in the purview of my invention, the construction and arrangement substantially as set forth in the appended claims. It is obvious that with this construction, that the gears 10 and 11 are positively driven successively in opposite directions as the shaft 9 rotates, due to the water wheel revolving in one direction as the tide flows in, and in the other direction as the tide flows out; that when the gear 10 is being driven in one direction, the other gear 11 is idle on shaft 9, but it will be driven through the medium of gear 12 and during such movement the gear 11 does not perform any work as at such time the work is performed through the medium of gear 10, it being clutched with the shaft 9 and transmitting power to shaft 6 through the medium of the gear 12; that the clutch is positive in its action and not an ordinary friction clutch; that the clutch dogs 15 in the one end of the clutch member 14, not resting on the upper side of the clutch member, will be caused by gravity to slide into their respective recesses so that they drop out of contact when the clutch member is revolved in the direction as shown in Fig. 4, thus leaving its adjacent gear idle and that when it is revolved in the opposite direction, by the action of gravity, the said clutch dogs in said end will assume the position shown in Fig. 3, and thereby contact with the projecting shoulders of the outer clutch member and thereby form an absolute clutch which allows no slipping; that the clutch 8 as mounted between the shafts 3 and 9 provides a means for removing the wheel or gear mechanisms separately.

Having thus described my invention, what I claim as new and desire to secure by Letters Patent is:—

1. In a clutch the combination of a shaft, a member revolubly mounted on said shaft, provided with a circular shaped recess in one side thereof, surrounding said shaft, provided with notches in the outer surface of said recess, another member rigidly secured to said shaft, with a portion thereof protruding into the recess in said first mentioned member, provided with lugs on the outer surface of said protruding portion, and with recesses between said lugs, provided with double angled bottoms, a plurality of dogs, provided with one double angled side, movably mounted in said recesses, adapted to fit in said latter mentioned recesses and slide therein, so as to engage with the notches in said recess when said inner member is revolved in one direction, and to slide on the surface thereof when it is revolved in the opposite direction.

2. In a clutch the combination of a shaft, a member revolubly mounted thereon, provided with a notched surface circular recess in one side thereof, surrounding said shaft, another member rigidly secured to said shaft so that a portion thereof protrudes into the recess in said first mentioned member, provided with a plurality of lugs extending so as to fill the smallest diameter of said recess in said first mentioned member, double angled bottom recesses between each adjacent pair of lugs, a plurality of dogs adapted to fit in the angled bottom surfaces of said last mentioned recesses, and when in such position their outer surface conform to the smallest diameter of said first mentioned recess, but when moved in one direction in said recess, will engage with the notches in said first mentioned recess, and carry said first mentioned member therewith, but when revolved in the opposite direction will fit the angled sides and not engage with said first mentioned member.

In testimony whereof, I have hereunto subscribed my name in the presence of two subscribing witnesses.

ALEXANDER N. JONES.

Witnesses:
ABRAM B. BOWMAN,
MARY A. BOWMAN.

Copies of this patent may be obtained for five cents each, by addressing the "Commissioner of Patents, Washington, D. C."